United States Patent [19]
Tomisawa

[11] Patent Number: 5,670,715
[45] Date of Patent: Sep. 23, 1997

[54] METHOD OF DIAGNOSING A MECHANISM FOR IMPROVING COMBUSTION IN AN INTERNAL COMBUSTION ENGINE AND APPARATUS THEREFOR

[75] Inventor: Naoki Tomisawa, Atsugi, Japan

[73] Assignee: Unisia Jecs Corporation, Kanagawa-ken, Japan

[21] Appl. No.: 684,361

[22] Filed: Jul. 19, 1996

[30] Foreign Application Priority Data

Jul. 28, 1995 [JP] Japan ................... 7-193297

[51] Int. Cl.⁶ ............ F02D 41/34; F02M 29/06; G01M 15/00
[52] U.S. Cl. .............. 73/118.1; 73/116; 340/439; 364/431.05
[58] Field of Search .............. 73/115, 116, 117.2, 73/117.3, 118.2, 118.1; 340/439; 364/431.05; 123/585, 679, 690, 704

[56] References Cited

U.S. PATENT DOCUMENTS

| | | | |
|---|---|---|---|
| 3,789,816 | 2/1974 | Taplin et al. | 73/116 |
| 4,104,990 | 8/1978 | Frobenius | 73/116 |
| 4,513,718 | 4/1985 | Ishii et al. | 73/116 |
| 4,517,831 | 5/1985 | Hirano | 73/116 |
| 4,789,939 | 12/1988 | Hamburg | 73/118.2 |
| 4,887,574 | 12/1989 | Kuroiwa et al. | 73/116 |
| 4,903,657 | 2/1990 | Miyazaki et al. | 73/115 |
| 5,386,723 | 2/1995 | Wier | 73/115 |
| 5,408,871 | 4/1995 | Lieder et al. | 73/118.2 |
| 5,452,603 | 9/1995 | Asano et al. | 73/116 |

FOREIGN PATENT DOCUMENTS

| | | |
|---|---|---|
| 63-17432 | 2/1988 | Japan . |
| 64-9465 | 2/1989 | Japan . |
| 6-101484 | 4/1994 | Japan . |

*Primary Examiner*—George M. Dombroske
*Attorney, Agent, or Firm*—Lowe, Price, LeBlanc & Becker

[57] ABSTRACT

In an internal combustion engine equipped with a mechanism for improving combustion such as a swirl control valve, the air-to-fuel ratio of the combustion mixture gas is increased until the stability of the engine reaches an allowable limit under the condition where the combustibility is to be improved by the mechanism for improving combustion. When the air-to-fuel rate at the allowable limit is equal to or smaller than a reference air-to-fuel ratio, whether or not the mechanism for improving combustion is defective is diagnosed.

18 Claims, 8 Drawing Sheets

METHOD OF DIAGNOSING A MECHANISM FOR IMPROVING COMBUSTION IN AN INTERNAL COMBUSTION ENGINE AND APPARATUS THEREFOR

BACKGROUND OF THE INVENTION

1. Field of the Invention

The present invention relates to a method of diagnosing a mechanism for improving combustion in an internal combustion engine and an apparatus therefor. More specifically, the invention relates to a method of diagnosing whether or not a mechanism for improving combustion is property operating to realize lean burn as a result of improving combustibility in an engine, and to an apparatus for diagnosing such a mechanism.

2. Related Art of the Invention

In order to improve fuel efficiency in recent years, a lean burn engine has been proposed according to which the mixture gas is burned at an air-to-fuel ratio (e.g., 20 to 25) which is much higher than a stoichiometric air-to-fuel ratio.

Such a lean burn engine is provided with a swirl control valve (hereinafter abbreviated as SCV) to ensure an ignition stability of a lean mixture gas, the SCV being closed during the lean burn to generate a strong swirl in a cylinder, so that the fuel and the air are mixed well together to form a homogeneous mixture gas to accomplish the lean burn (see Japanese Unexamined Patent Publication No. 6-101484). Similarly, a mechanism has heretofore been known for generating a tumble in the cylinders.

A device has also been known according to which part of the intake air is introduced as assist air from an intake passage on the upstream side of the throttle valve to near an injection port of a fuel injection valve, and the assist air is brought into collision with the fuel injected from the fuel injection valve to atomize the fuel, so that the ignition stability of the lean mixture gas can be improved (see Japanese Examined Patent Publication No. 64-9465).

The mechanism for improving combustion such as the above-mentioned SCV and the assist air-feeding mechanism are to realize lean burn. Therefore, in case such mechanisms fail to give swirling motion to the mixture gas or fail to atomize the fuel due to malfunctioning, the combustion efficiency deteriorates often causing the exhaust gas property and the engine operation to lose stability.

It is therefore desired to provide a method and an apparatus for diagnosing the occurrence of malfunctioning in the mechanism for improving combustion. For example, whether the SCV properly opens or closes is detected by using a switch which turns on or off depending upon the opening or closure of the valve, and whether the assist air is properly fed or not is detected based on the output of a pressure sensor which detects the air pressure in the assist air-feeding passage, thereby enabling malfunctioning diagnosis.

Since such diagnosing methods, however, require a special sensor and a switch for diagnosis, there are problems that the cost is raised and, further, space for installing the sensor and the like is required.

Besides, even when the assist air is normally fed, there is a likelihood of a fault such that the fuel is not favorably atomized by the assist air. Therefore, it is desired to provide a method and apparatus capable of diagnosing whether an improvement in the combustibility which is the final object of the combustion improving mechanism has been accomplished or not.

SUMMARY OF THE INVENTION

The present invention was accomplished in view of the above-mentioned problems, and its object is to provide a method of diagnosing the occurrence of malfunctioning in a mechanism for improving combustion such as SCV and assist air feeding mechanism, and an apparatus therefor, without requiring any special sensor.

Another object of the invention is to diagnose the malfunctioning of the mechanism for improving combustion relying upon whether an improvement in the combustibility which is the object of the invention has been accomplished or not.

In order to accomplish the above-mentioned objects, the present invention is concerned with a method and an apparatus for diagnosing a mechanism for improving combustion in an internal combustion engine, said mechanism for improving combustion including an operation unit operated by an actuator and controlling the supply of a combustion component into the internal combustion engine by means of said operation unit, thereby achieving the combustibility improvement, wherein, under a condition where the combustibility is to be improved by the mechanism for improving combustion, stability of the engine is sequentially detected and an air-to-fuel ratio of the combustion mixture gas is gradually increased until the stability of the engine reaches a previously set allowable limit, and, when the air-to-fuel ratio at a moment when the allowable limit is reached is equal to or smaller than a reference air-to-fuel ratio, a fault diagnosis signal indicating the occurrence of malfunctioning in the mechanism for improving combustion is output.

That is, the above-mentioned mechanism for improving combustion is to realize lean burn by improving combustibility by atomizing the fuel and homogenizing the mixture gas. Therefore, in case the fuel is not atomized or the mixture gas is not homogenized due to malfunctioning, since stability in the combustion is deteriorated, stability is no longer maintained in a lean air-to-fuel ratio which could have maintained the engine stability to a sufficient degree during the normal operation. Therefore, the air-to-fuel ratio is gradually increased to find a limit of the lean burn, and whether the mechanism for improving combustion is operating as desired or not is diagnosed depending upon whether the limit of the lean burn has reached a predetermined lean air-to-fuel ratio.

Here, the stability of the engine can be detected based upon a rate of change in the pressure in the engine cylinders or a rate of change in the rotational speed of the engine.

According to the present invention, furthermore, an assist air-feeding mechanism which atomizes the fuel by bringing part of the intake air as assist air into collision with the fuel injected from a fuel injection valve, and has, as an operation unit, a valve for opening and closing an assist air-feeding passage may be the mechanism for improving combustion that is to be diagnosed.

The assist air-feeding mechanism enhances the ignition stability by atomizing the fuel. When a trouble occurs such as interruption of the assist air feed due to a trouble in the valve (inclusive of both mechanical trouble and electrical trouble), the fuel is no longer atomized and a limit of lean burn decreases.

An intake air control mechanism having, as an operation unit, an intake air control valve that opens and closes an air intake system for homogenizing the mixture gas by swirling the mixture gas, may be a combustion improving mechanism that is to be diagnosed.

The intake air control mechanism improves the combustibility by homogenizing the mixture gas by causing the mixture gas to be swirled or tumbled. When the mixture gas is no longer swirled or tumbled due to a trouble in the intake air control valve, the mixture gas is no longer homogenized, and a limit of lean burn decreases.

Other objects and advantages of the invention will become obvious from the following description of embodiments with reference to the accompanying drawings.

PREFERRED EMBODIMENTS

Figure 1:
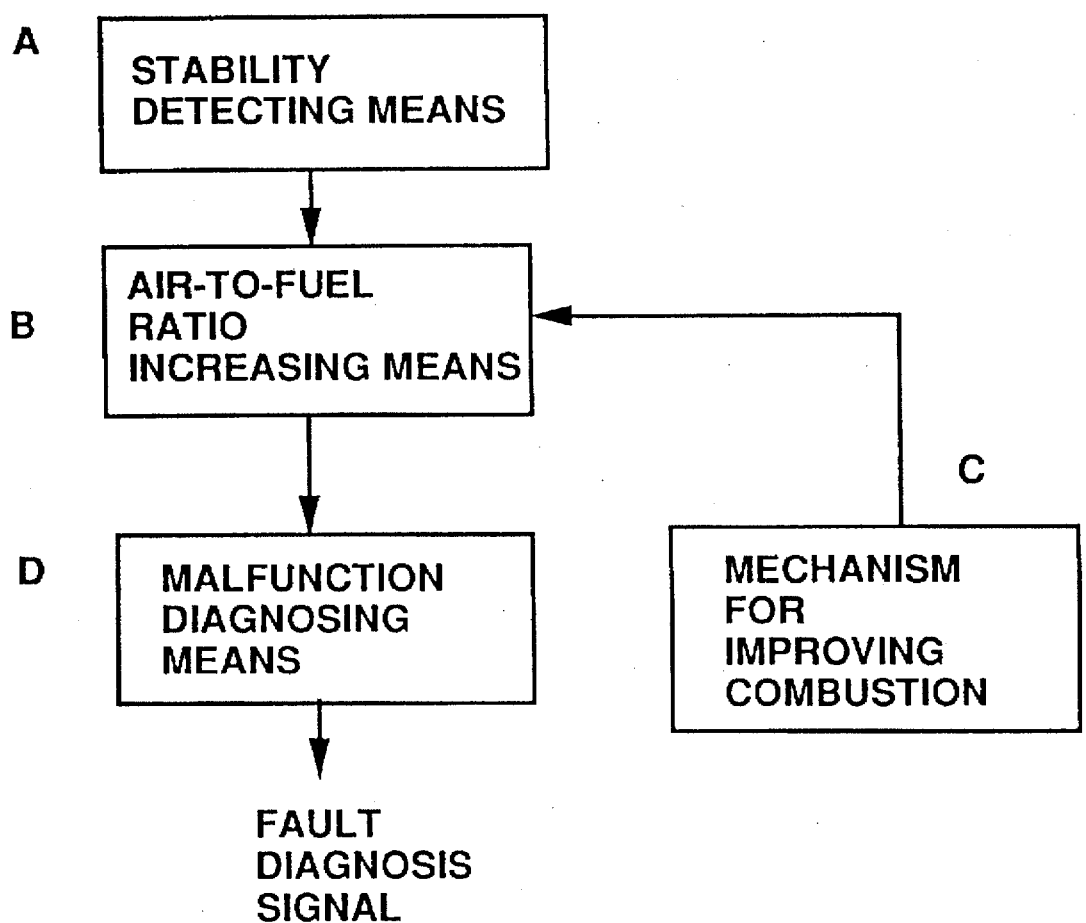
FIG. 1 is a block diagram illustrating the fundamental constitution of a diagnosing apparatus according to the present invention.

FIG. 1 is a block diagram illustrating the fundamental constitution of an apparatus for diagnosing mechanism for improving combustion according to the present invention.

In FIG. 1, a stability detecting means A detects the stability of an engine based upon a rate of change in the rotational speed or a rate of change in the pressure in a cylinder. An air-to-fuel ratio increasing means B increases the air-to-fuel ratio of a combustion mixture gas by controlling the amount of fuel injection until the stability of the engine as detected by the stability detecting means A reaches a previously set allowable limit under the condition where the combustibility has been improved by a mechanism C for improving combustion such as assist air-feeding mechanism or intake air control mechanism.

When the air-to-fuel ratio is equal to or smaller than a reference air-to-fuel ratio at a moment when the stability of the engine has reached the allowable limit as a result of increasing the air-to-fuel ratio by the air-to-fuel ratio increasing means B, a malfunction diagnosing means D so judges that the fuel has not been atomized or the mixture gas has not been swirled due to malfunction of the mechanism C for improving combustion, and outputs a fault diagnosis signal.

Described below are concrete embodiments of the apparatus and method of diagnosing the mechanism for improving combustion that has the above-mentioned fundamental constitution.

Figure 2:
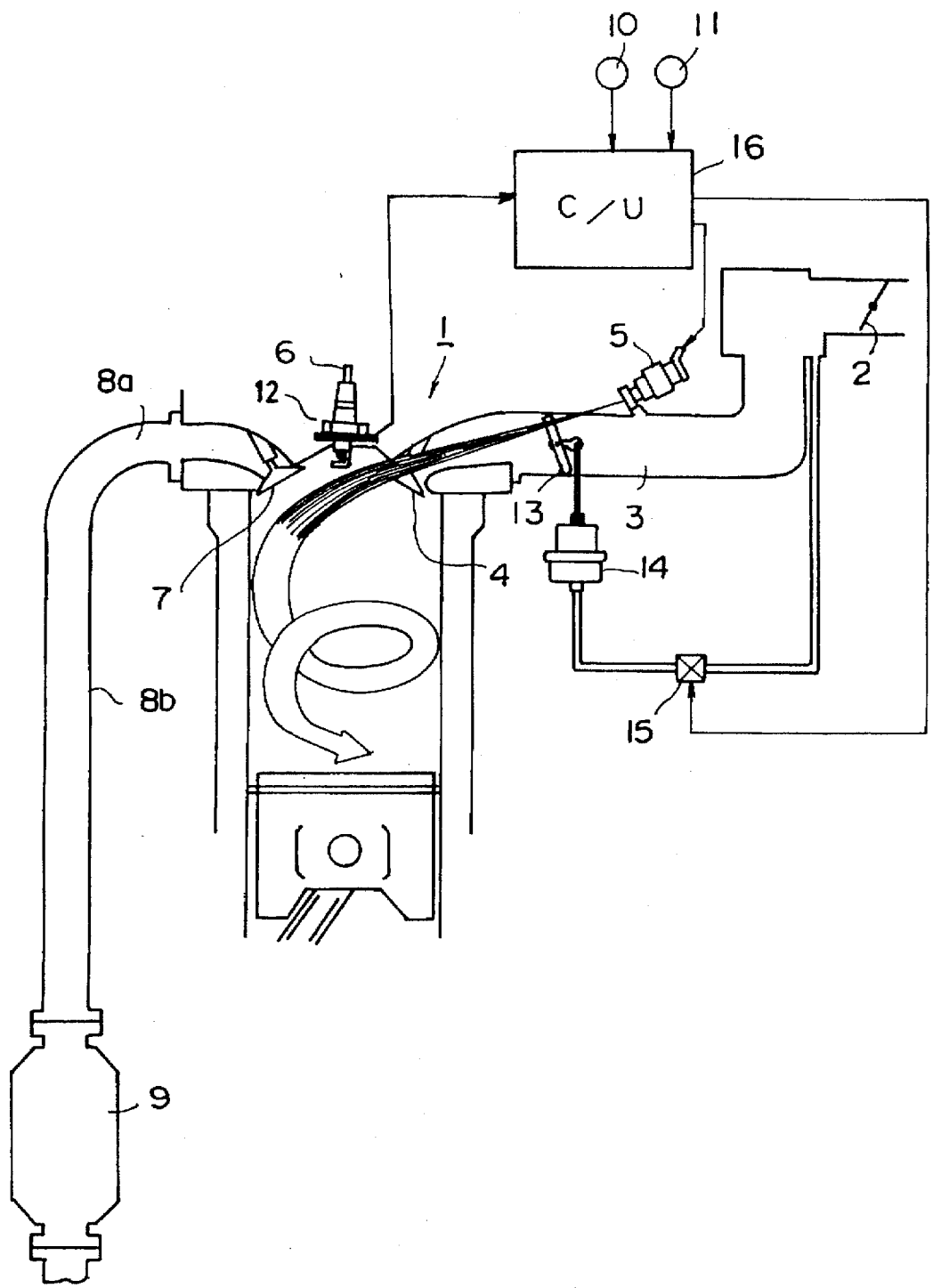
FIG. 2 is a system diagram illustrating an embodiment equipped with an SCV.

Referring to FIG. 2 which illustrates the constitution of a system according to an embodiment, an internal combustion engine 1 intakes the air through a throttle valve 2, an intake manifold 3 and an intake valve 4.

The intake manifold 3 is provided at each branch portion thereof with a fuel injection valve 5 for each of the cylinders. The fuel injection valve 5 is an electromagnetic fuel injection valve which opens when a current is supplied to a solenoid and closes when the supply of current is interrupted; i.e., the fuel injection valve 5 opens upon receiving an injection pulse signal from a control unit 16 that will be described later and injects into the engine 1 the fuel which is supplied from a fuel pump that is not shown and of which pressure is adjusted to a predetermined pressure by a pressure regulator.

Each combustion chamber of the engine 1 is provided with an ignition plug 6 which produces spark to ignite and burn the mixture gas. The engine 1 discharges the exhaust gas through an exhaust valve 7, an exhaust manifold 8a, an exhaust duct 8b and a catalytic converter 9.

The control unit 16 is equipped with a microcomputer which is constituted by CPU, ROM, RAM, ND converter and input/output interface, and receives input signals from various sensors, calculates the fuel injection amount Ti through the fuel injection valve 5, and controls the operation of the fuel injection valve 5 based upon the fuel injection amount Ti.

These variety of sensors include an air flow meter 10 for detecting the engine intake air flow amount Q, a crank angle sensor 11 for taking out a rotational signal from a crank shaft or a cam shaft, a cylinder pressure sensor 12 (cylinder pressure detecting means) for detecting the pressure in the cylinder of the engine, and the like sensors.

By measuring the period of a detection signal output from the crank angle sensor 11 for each a predetermined crank angle or by measuring the frequency of generation of the detection signals within a predetermined period of time, it is made possible to calculate the rotational speed Ne of the engine. Therefore, the crank angle sensor 11 corresponds to a rotational speed detecting means.

As disclosed in Japanese Unexamined Utility Model Publication No. 63-17432, furthermore, the cylinder pressure sensor 12 is a ring-like sensor which includes a piezoelectric element, and is mounted as a washer of the ignition plug 6. Upon receiving the combustion pressure, the ignition plug 6 is lifted up, whereby the set load undergoes a change to output a signal that corresponds to the pressure in the cylinder.

The CPU of the microcomputer incorporated in the control unit 16 is equipped with an air-to-fuel ratio map in which have been set target air-to-fuel ratios depending upon the engine load represented by a basic fuel injection amount Tp and the engine rotational speed Ne. In order to form a mixture gas of the target air-to-fuel ratio stored in the air-to-fuel ratio map, the CPU calculates a basic fuel injection amount Tp (=K×Q/Ne; K is a constant) based upon the intake air flow amount Q and the engine rotational speed Ne, and, further calculates a final fuel injection amount Ti by variously correcting the basic fuel injection amount Tp depending upon the operation conditions of the engine. The CPU outputs an injection pulse signal of a pulse width corresponding to the fuel injection amount Ti to each of the fuel injection valves 5 in synchronism with the intake stroke of each of the cylinders.

The air-to-fuel ratio map contains, as a target air-to-fuel ratio, a lean air-to-fuel ratio (e.g., 20 to 25) which is very higher than a stoichiometric air-to-fuel ratio (14.7) for the region of low load and low rotational speed operations, and the region of high load and high rotational speed operations other than the above region of lean burn operations is made to be the region of an output combustion operations wherein, the stoichiometric air-to-fuel ratio, or an air-to-fuel ratio (e.g., about 13) which is slightly smaller than the stoichiometric air-to-fuel ratio is set as target air-to-fuel ratio.

The engine 1 is provided with a swirl control valve (hereinafter abbreviated as SCV) 13 at a portion of each intake port of the intake manifold 3. The SCV 13 is a butterfly-type throttle valve with a notch. When the SCV 13 is closed, the flow of the intake air is deflected to produce a strong swirl (swirling motion in the transverse direction) in the cylinder, to enhance the ignition stability during the lean burn operation.

Provision is made of a diaphragm 14 as an actuator for opening and closing the SCV 13. The SCV 13 can be driven to open and close by controlling the negative pressure of the engine introduced into a pressure chamber of the diaphragm 14 using an electromagnetic three-way change-over valve 15.

An electric motor may be used as an actuator for opening and closing the SCV 13 which is the operation unit.

The three-way change-over valve 15 is controlled by the control unit 16. In other words, in the lean burn operation region, the control unit 16 controls the three-way change-over valve 15 to close the SCV 13 so as to give a swirling motion to the mixture gas (combustion component).

Figure 3:
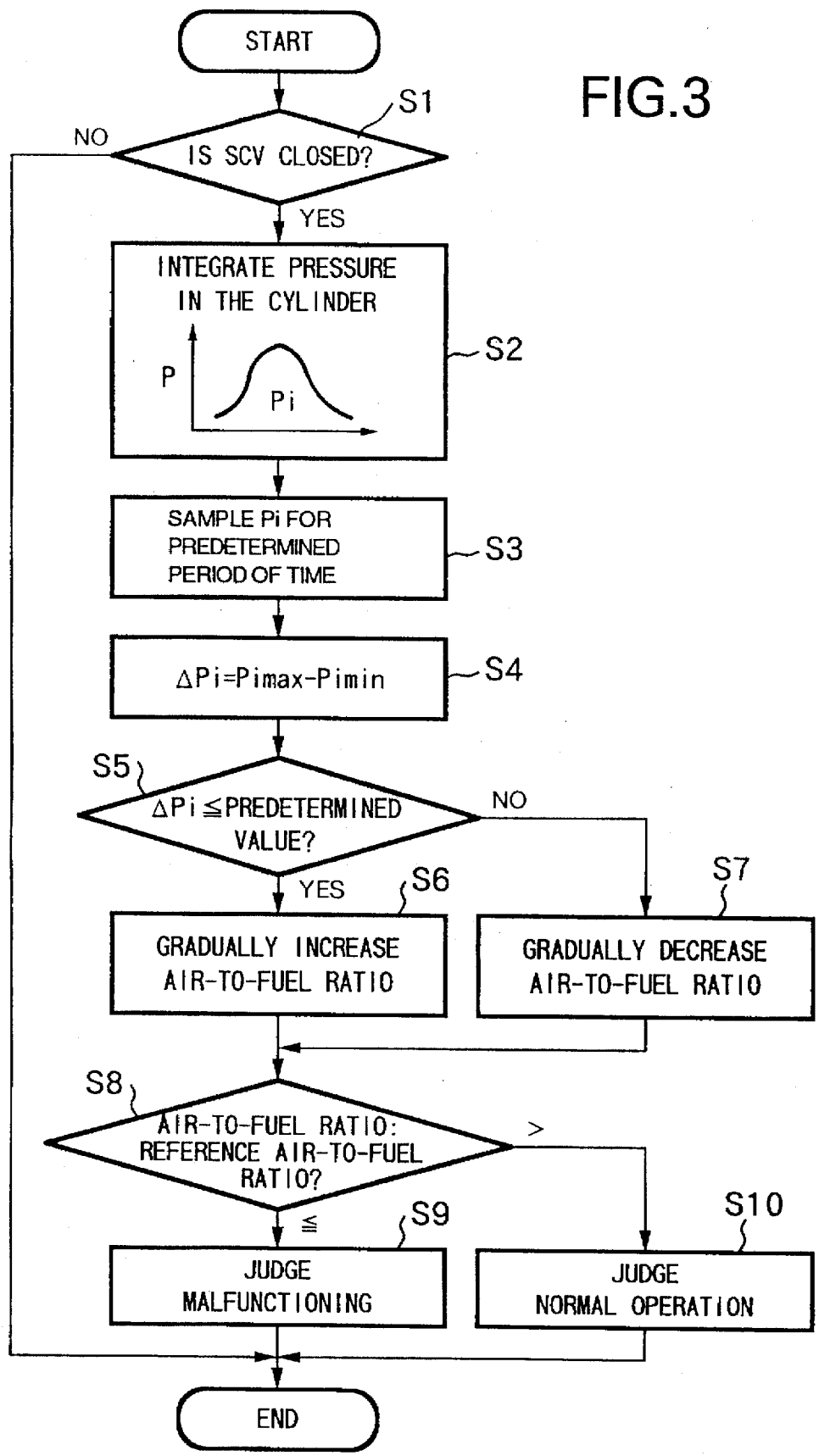
FIG. 3 is a flow chart illustrating an embodiment for diagnosing malfunctioning of the SCV relying upon the pressure in a cylinder.

As shown in the flow chart of FIG. 3, furthermore, the control unit 16 diagnoses the occurrence of malfunction in the intake air control mechanism which is a mechanism for improving combustion constituted by the SCV 13, diaphragm 14 and three-way change-over valve 15.

The function of the air-to-fuel ratio increasing means and the function of the malfunction diagnosing means are possessed in a software manner by the control unit 16 as shown in the flow chart of FIG. 3, and since the stability of the engine is detected based upon a rate of change in the pressure in the cylinder detected by the cylinder pressure sensor 12, the cylinder pressure sensor 12 corresponds to the stability detecting means.

Referring to the flow chart of FIG. 3, it is, first, discriminated at step 1 (expressed as S1 in FIG. 3, the same holds thereinafter) whether the three-way change-over valve 15 is so controlled as to close the SCV 13 to generate the swirling.

When the SCV 13 is in the closed state, the program proceeds to step 2 where a pressure in the cylinder detected by the cylinder pressure sensor 12 is integrated over a predetermined crank angle range (e.g., TDC to ATDC 100°) to obtain an integrated value Pi.

At next step 3, the integrated value Pi is sampled for a predetermined period of time, and a plurality of the integrated values Pi obtained during the predetermined period of time are stored.

At step 4, a deviation $\Delta Pi$ (=Pimax−Pimin) is calculated between a maximum value Pimax and a minimum value Pimin among a plurality of integrated values Pi obtained within the predetermined period of time.

At step 5, it is discriminated whether or not the deviation $\Delta Pi$ (rate of change in the pressure in the cylinder) is equal to or smaller than a predetermined value that corresponds to the allowable limit value of stability of the engine. When the deviation $\Delta Pi$ is equal to or smaller than the predetermined value, it is so presumed that the air-to-fuel ratio can be further increased yet maintaining the engine stability within the allowable range, and the program proceeds to step 6 where the fuel injection amount is decreasingly corrected to gradually increase the air-to-fuel ratio.

When the deviation $\Delta Pi$ is in excess of the predetermined value, the program proceeds to step 7 where the fuel injection amount is increasingly corrected to gradually decrease the air-to-fuel ratio in order to recover the engine stability.

As described above, the fuel injection amount is corrected by comparing the deviation $\Delta Pi$ with the predetermined value, thereby increasing the air-to-fuel ratio up to the allowable limit.

At step 8, the air-to-fuel ratio (lean limit air-to-fuel ratio) obtained as a result of controlling the air-to-fuel ratio based upon the deviation $\Delta Pi$ is compared with a reference air-to-fuel ratio.

Figure 4:
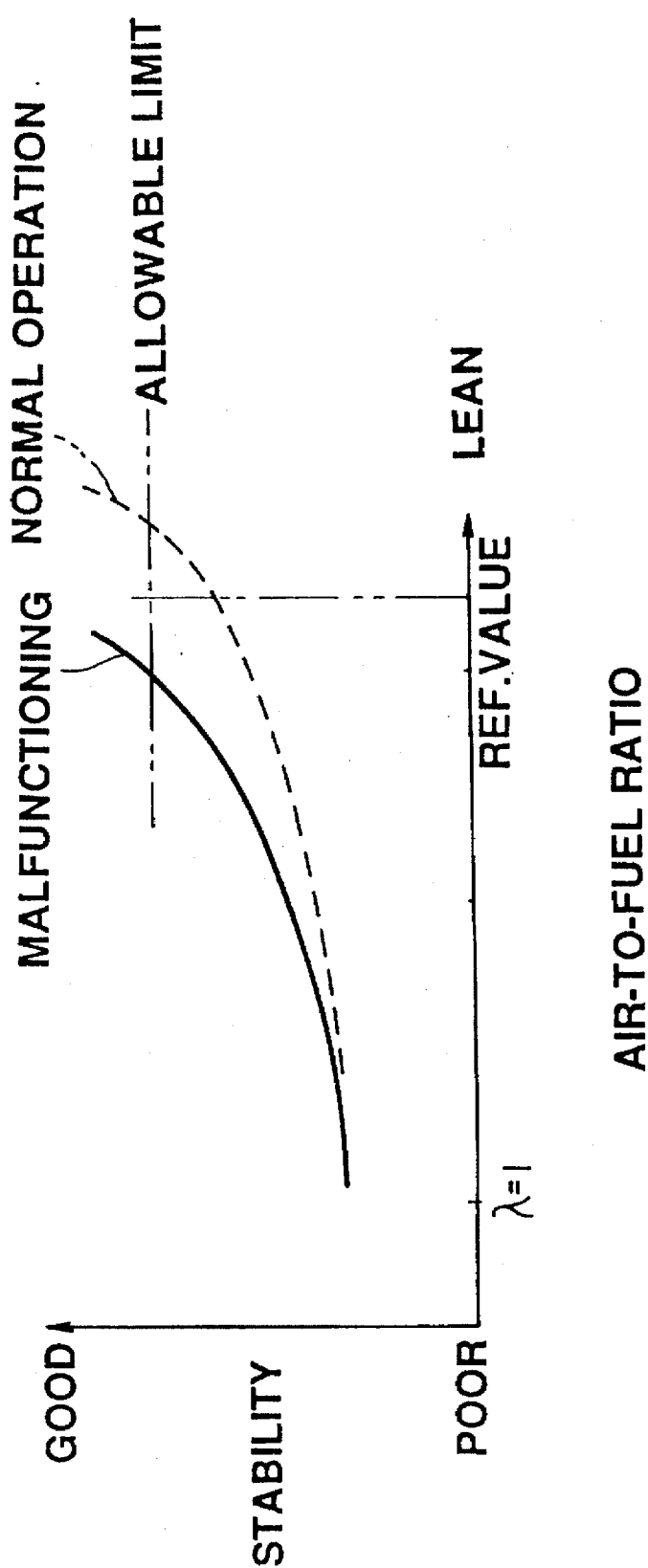
FIG. 4 is a graph illustrating a change in the lean limit air-to-fuel ratio due to malfunctioning of a mechanism for improving combustion.

The reference air-to-fuel ratio has been set to be smaller than the lean limit air-to-fuel ratio of when the SCV 13 is actually closed and a strong swirl is generated in the cylinder, and to be larger than the lean limit air-to-fuel ratio when the SCV 13 is not closed despite it is so controlled as to be closed and a strong swirl is not generated (see FIG. 4).

Therefore, when it is discriminated at step 8 that the lean limit air-to-fuel ratio obtained as a result of controlling the air-to-fuel ratio based on the deviation $\Delta Pi$ is equal to or smaller than the reference air-to-fuel ratio, the program proceeds to step 9 where it is judged that, since the intake air control mechanism constituted by the SCV 13, diaphragm 14 and three-way change-over valve 15 is malfunctioning, the swirling is not generated as desired and the lean limit air-to-fuel ratio has decreased. Accordingly, a fault diagnosis signal is output.

Malfunction in the intake air control mechanism includes mechanical defect of the SCV 13, diaphragm 14 and three-way change-over valve 15, as well as electrical defect such as disconnection and short-circuit of control line to the three-way change-over valve 15.

When the fault diagnosis signal indicating the occurrence of malfunctioning of the intake air control mechanism is output, a fail safe control is executed such as inhibiting the lean burn or warning the occurrence of malfunction in the intake air control mechanism.

On the other hand, when it is discriminated at the step 8 that the lean limit air-to-fuel ratio obtained as a result of controlling the air-to-fuel ratio based upon the deviation $\Delta Pi$ is larger than the reference air-to-fuel ratio, the program proceeds to step 10 where it is judged that, since the intake air control mechanism is properly operating and the SCV 13 is closed as controlled, a strong swirl is generated as desired, and the combustibility is improved.

Here, the cylinder pressure sensor 12 can also be used for diagnosing misfire. Therefore, malfunctioning in the intake air control mechanism can be diagnosed without driving up the manufacturing cost provided the engine is equipped with the cylinder pressure sensor 12 for diagnosing misfire.

In the foregoing description, the pressure in the cylinder was integrated over a predetermined crank angle range. It is, however, also allowable to employ a constitution in which a rate of change in the maximum pressure in the cylinder or a rate of change in the pressure in the cylinder at a predetermined crank angle is calculated as a parameter for indicating stability.

In the foregoing description, furthermore, the stability of the engine was detected based on the rate of change in the pressure in the cylinder. It is, however, also possible to judge the stability of the engine based upon a rate of change in the rotational speed Ne of the engine. Electronic control of the ignition timing and the fuel injection requires data related to the rotational speed Ne of the engine. Therefore, a system for detecting the stability based upon a rate of change in the rotational speed Ne of the engine can be constituted without requiring any special sensor and without driving up the manufacturing cost.

Figure 5:
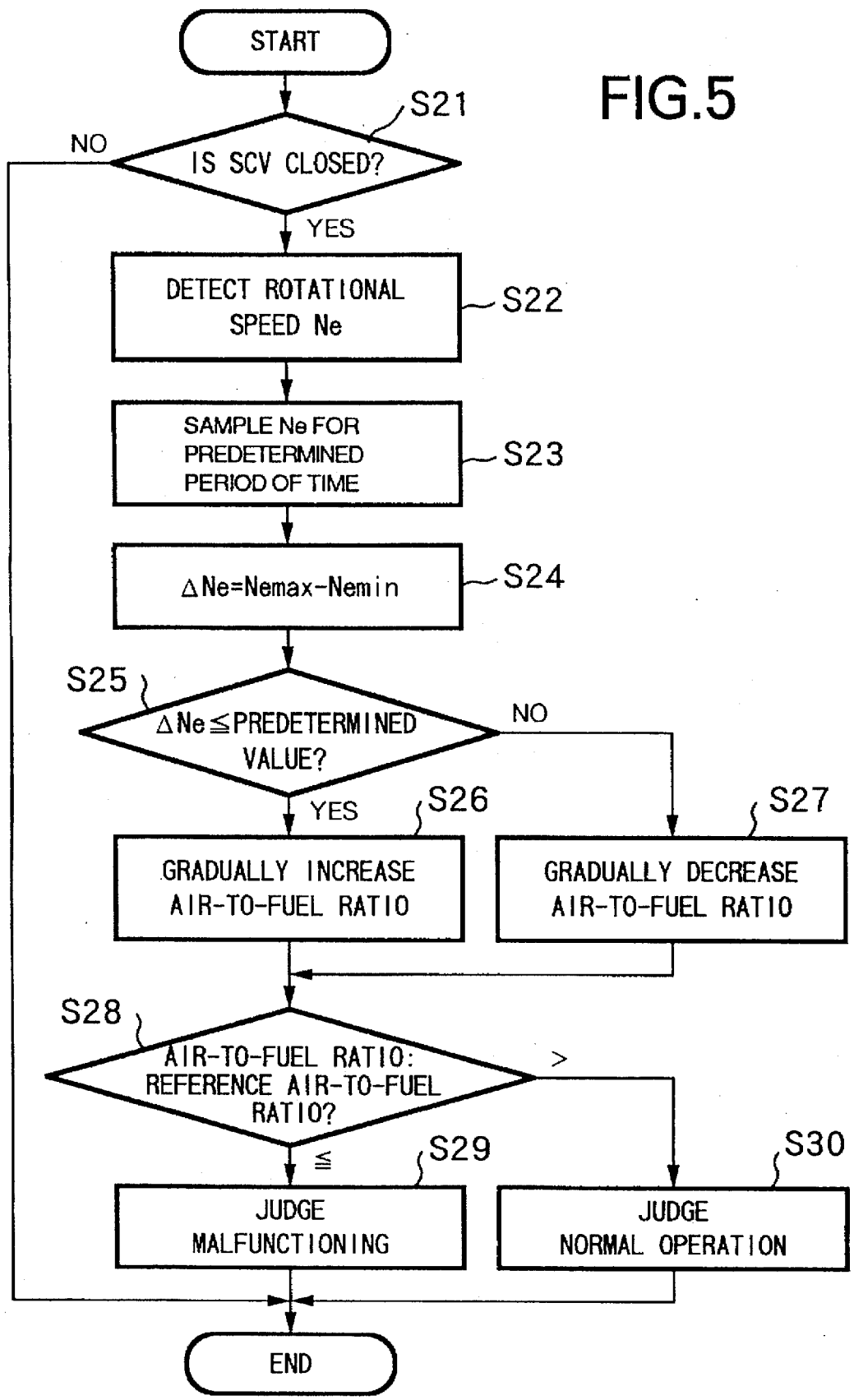
FIG. 5 is a flow chart illustrating an embodiment for diagnosing malfunctioning of the SCV relying upon the rotational speed of the engine.

The flow chart of FIG. 5 illustrates another embodiment for diagnosing malfunction in the intake air control mechanism by discriminating the stability based on the rate of change in the rotational speed Ne of the engine. In this embodiment, since the stability is discriminated based on the rate of change in the rotational speed Ne of the engine as described above, the crank angle sensor 11 which is a rotational speed detecting means corresponds to means for detecting stability.

Referring to the flow chart of FIG. 5, it is discriminated at step 21 whether or not the three-way change-over valve 15 is so controlled as to close the SCV 13 to generate the swirling.

When the SCV 13 is in the closed state, the program proceeds to step 22 where the rotational speed Ne of the engine is calculated based upon detection signals from the crank angle sensor 11.

At step 23, the rotational speed Ne of the engine is sampled over a predetermined period of time.

At step 24, a deviation ΔNe (=Nemax−Nemin) is calculated between a maximum value Nemax and a minimum value Nemin among the rotational speeds Ne of the engine sampled within the predetermined period of time.

At step 25, the deviation ΔNe (rate of change in the rotational speed) is compared with a predetermined value. When the deviation ΔNe is equal to or smaller than the predetermined value, the air-to-fuel ratio is gradually increased at step 26. When the deviation ΔNe is larger than the predetermined value, on the other hand, the air-to-fuel ratio is gradually decreased at step 27 to recover the stability.

Hereinafter, like in the steps 8 to 10 shown in the flow chart of FIG. 3, the air-to-fuel ratio obtained as a result of accomplishing the lean limit air-to-fuel ratio is compared with the reference air-to-fuel ratio, thereby diagnosing malfunction in the intake air control mechanism (steps 28 to 30).

Figure 6:
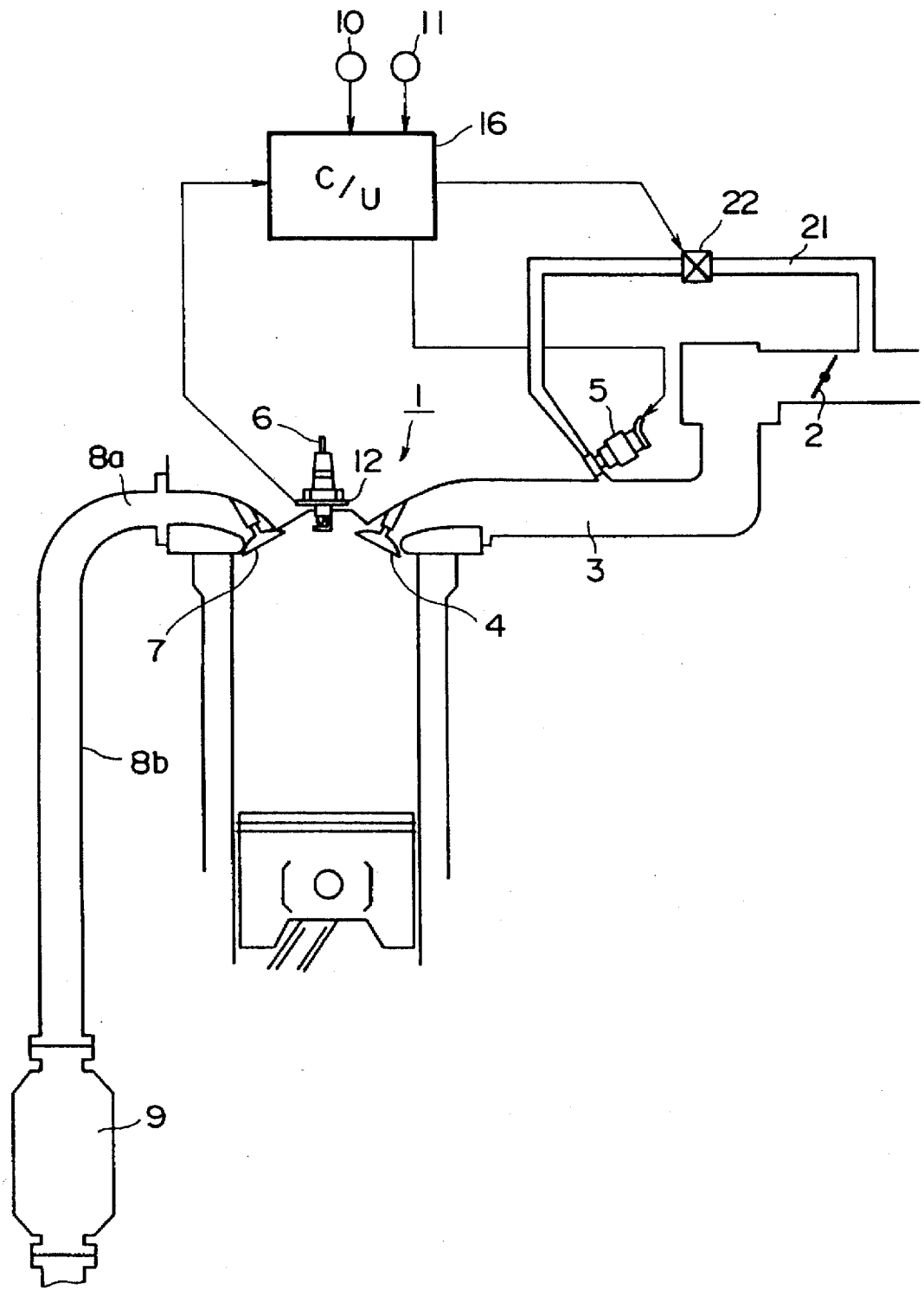
FIG. 6 is a system illustrating an embodiment which is equipped with an assist air-feeding mechanism.

The above-mentioned embodiments have dealt with the engine equipped with an intake air control mechanism which generates swirling (or tumbling) in the cylinder as a mechanism for improving combustion. As shown in FIG. 6, however, the engine may be provided with an assist air-feeding mechanism in which part of the intake air is brought as assist air into collision with the fuel injected from the fuel injection valve 5 to atomize the fuel, as a mechanism for improving combustion. In FIG. 6, the same elements as those of FIG. 2 are denoted by the same reference numerals and their description is omitted.

The engine 1 shown in FIG. 6 is provided with an assist air passage 21 which bypasses the throttle valve 2 and is opened near the injection port of each of the fuel injection valves 5. The air (hereinafter referred to as assist air) introduced due to the pressure difference between the upstream and downstream of the throttle valve 2, is injected near the injection port of the fuel injection valve 5 so as to come into collision with the injected fuel, so that the injected fuel is atomized.

A normally-closed electromagnetic valve 22 is provided on the way of the assist air passage 21 to open the assist air passage 21 in a turned-on/turned-off manner. The electromagnetic valve 22 is turned on or off by the control unit 16 based upon data such as cooling water temperature Tw, etc., and change-over controls the supply or interruption of the assist air that is injected near the injection port as part of the air intaken by the engine. That is, the valve body of the electromagnetic valve 22 corresponds to the operation unit and the electromagnetic coil corresponds to the actuator thereby to control the supply of the assist air which is part of the intake air that is the combustion component.

Here, the control unit 16 diagnoses the occurrence of malfunctioning in the assist air-feeding mechanism which comprises the assist air passage 21 and the electromagnetic valve 22 according to the same procedure as that of the flow chart of FIG. 3 or 5.

Figure 7:
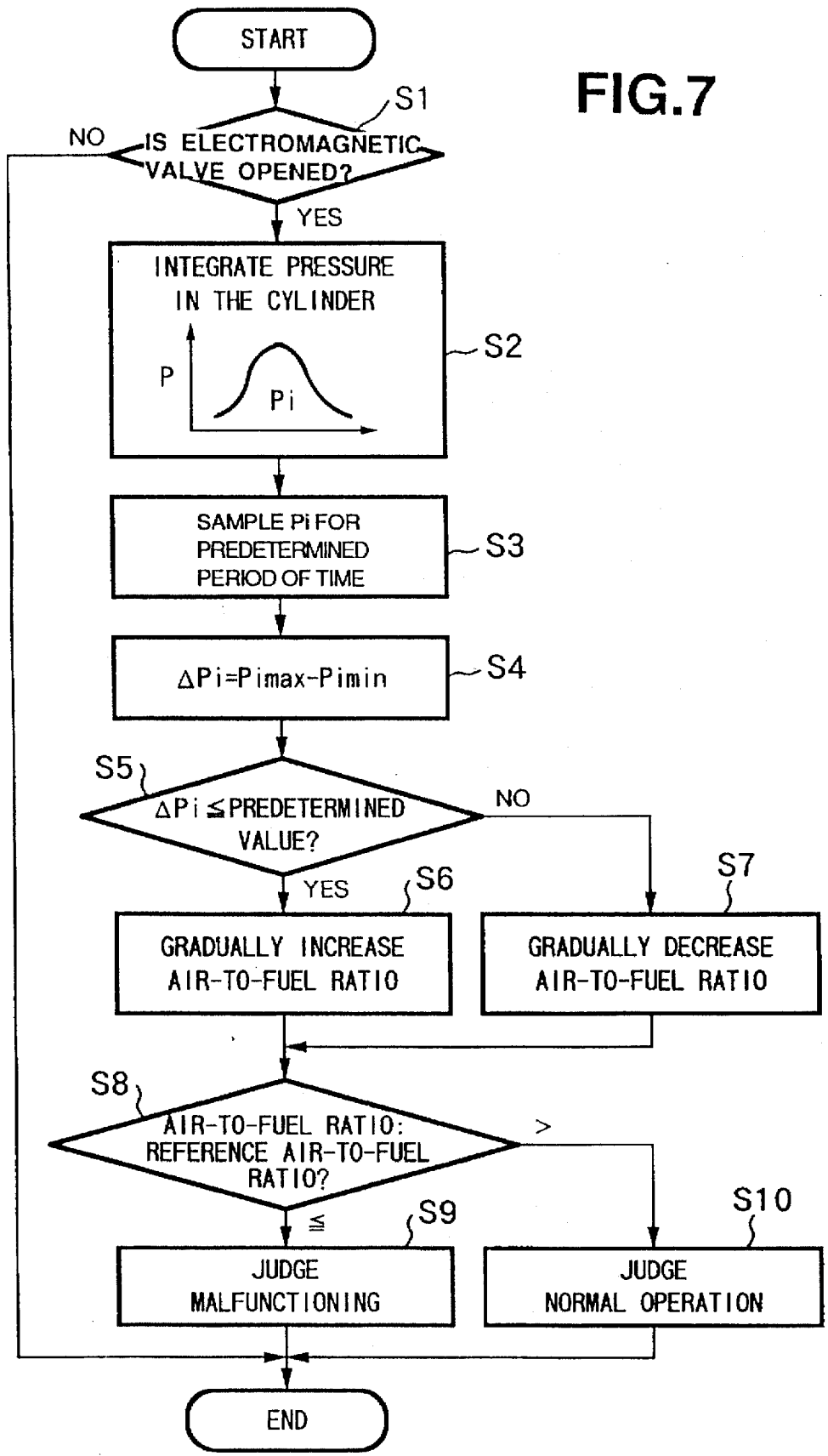
FIG. 7 is a flow chart of an embodiment for diagnosing malfunctioning of the assist air-feeding mechanism relying on the pressure in a cylinder.
Figure 8:
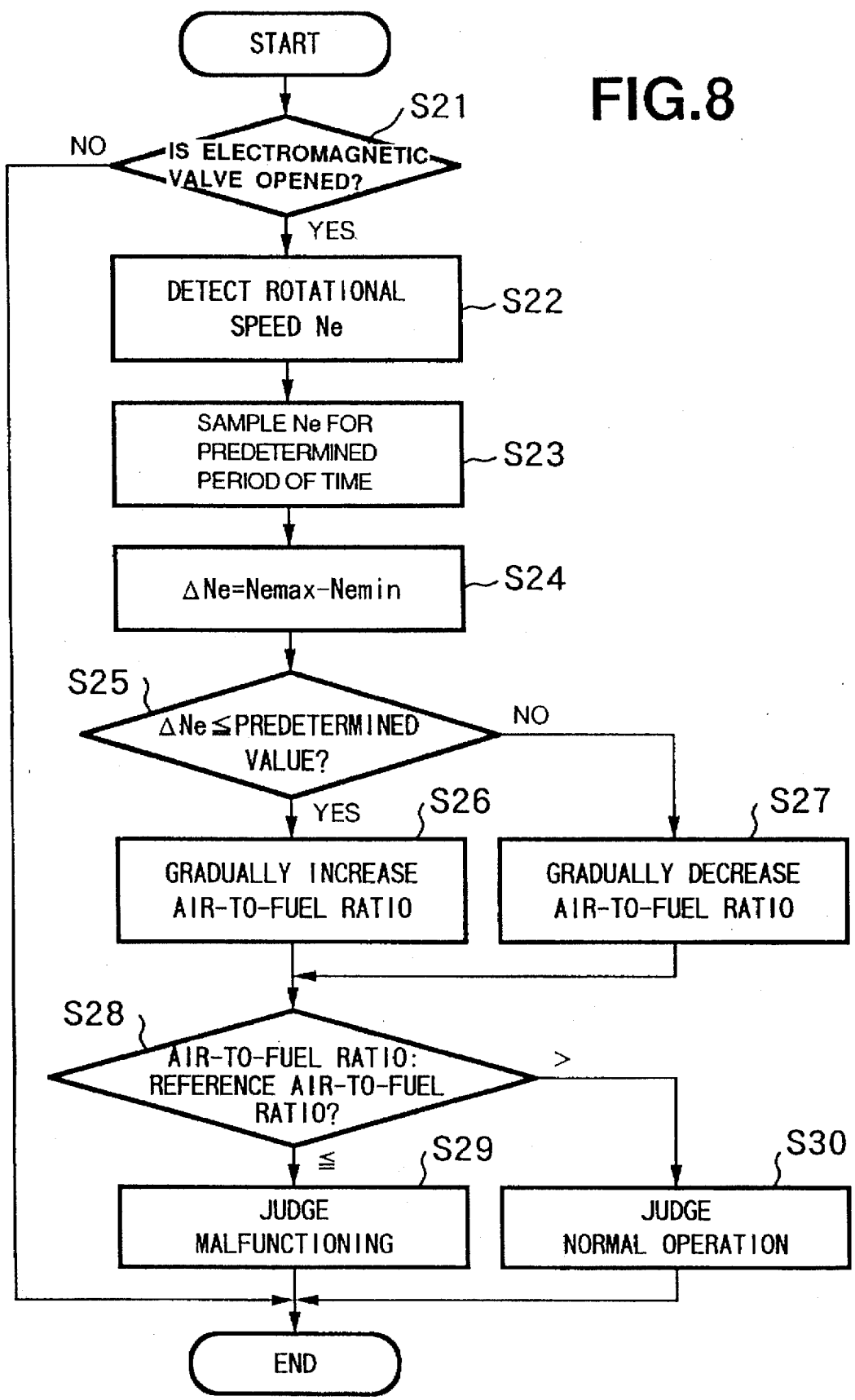
FIG. 8 is a flow chart illustrating an embodiment for diagnosing malfunctioning of the assist air-feeding mechanism relying upon the rotational speed of the engine.

That is, the content of processing at step 1 in the flow chart of FIG. 3 or at step 21 in the flow chart of FIG. 5 is changed into the processing for discriminating whether the electromagnetic valve 22 is in the open state or not (step 1a or step 21a) in the flow chart of FIG. 7 or 8, thereby diagnosing the malfunctioning in the same manner as the aforementioned embodiments.

When the assist air-feeding mechanism malfunctions and fails to feed the assist air although the electromagnetic valve 22 is opened due to clogging in the assist air passage 21 or adhesion of the electromagnetic valve 22 in the closed state, the fuel is not atomized by the assist air and the lean limit air-to-fuel ratio decreases. Therefore, whether the assist air-feeding mechanism is malfunctioning or not can be diagnosed by discriminating whether the air-to-fuel ratio is a value that is expected in a state where the assist air is normally fed, the air-to-fuel ratio having been increased to a degree with which the stability of the engine is on the verge of the allowable limit as discriminated based upon the rate of change in the cylinder pressure or in the rotational speed of the engine.

I claim:

1. A method of diagnosing a mixture leaning mechanism in an internal combustion engine, said mixture leaning mechanism including an operation unit operated by an actuator and controlling supply of a combustion component to the internal combustion engine by means of said operation unit to achieve combustibility improvement, comprising the steps of:

gradually increasing an air-to-fuel ratio of the combustion mixture gas under a condition where the combustibility is to be improved by said mixture leaning mechanism, until stability of the engine reaches a previously set allowable limit, and, outputting a fault diagnosis signal indicating the occurrence of malfunctioning in said mixture leaning mechanism when said air-to-fuel ratio is equal to or smaller than a reference air-to-fuel ratio at a moment when the allowable limit is reached.

2. A method of diagnosing a mechanism for improving combustion in an internal combustion engine according to claim 1, wherein the stability of said engine is detected based upon a rate of change in the pressure in a cylinder of the engine.

3. A method of diagnosing a mechanism for improving combustion in an internal combustion engine according to claim 1, wherein the stability of said engine is detected based upon a rate of change in the rotational speed of the engine.

4. A method of diagnosing a mechanism for improving combustion in an internal combustion engine according to claim 1, wherein said mechanism for improving combustion is an assist air-feeding mechanism which atomizes the fuel by bringing part of the intake air as assist air into collision with the fuel injected from a fuel injection valve, and has, as an operation unit, a valve for opening and closing an assist air-feeding passage.

5. A method of diagnosing a mechanism for improving combustion in an internal combustion engine according to claim 1, wherein said mechanism for improving combustion is an intake air control mechanism which has, as an operation unit, an intake air control valve that opens and closes an air intake system so as to swirl the mixture gas and to homogenize the mixture gas.

6. An apparatus for diagnosing a mixture leaning mechanism for improving combustion in an internal combustion engine, said mixture leaning mechanism including an operation unit operated by an actuator and controlling the supply of a combustion component into the internal combustion engine by means of said operation unit, said apparatus comprising:

stability detecting means for detecting stability of an engine;

air-to-fuel ratio increasing means for gradually increasing an air-to-fuel ratio of the combustion mixture gas under a condition where combustibility is to be improved by said mixture leaning mechanism, until the stability of the engine detected by said stability detecting means reaches a previously set allowable limit; and malfunction diagnosing means for outputting a fault diagnosis signal indicating the occurrence of malfunction in said mixture leaning mechanism when the air-to-fuel ratio is equal to or smaller than a reference air-to-fuel ratio at a moment when the stability of the engine has reached the allowable limit as a result of increasing the air-to-fuel ratio by said air-to-fuel ratio increasing means.

7. An apparatus for diagnosing a mechanism for improving combustion in an internal combustion engine according to claim 6, wherein said stability detecting means includes a cylinder pressure detecting means which detects the pressure in a cylinder of the engine, and calculates a rate of change in the pressure in the cylinder of the engine detected by said cylinder pressure detecting means as a parameter for indicating the stability of the engine.

8. An apparatus for diagnosing a mechanism for improving combustion in an internal combustion engine according to claim 6, wherein said stability detecting means includes a rotational speed detecting means which detects the rotational speed of the engine, and calculates a rate of change in the rotational speed of the engine detected by said rotational speed detecting means as a parameter for indicating the stability of the engine.

9. An apparatus for diagnosing a mechanism for improving combustion in an internal combustion engine according to claim 6, wherein said mechanism for improving combustion is an assist air-feeding mechanism which atomizes the fuel by bringing the assist air into collision with the fuel injected from a fuel injection valve, and has, as an operation unit, a valve for opening and closing an assist air-feeding passage.

10. An apparatus for diagnosing a mechanism for improving combustion in an internal combustion engine according to claim 6, wherein said mechanism for improving combustion is an intake air control mechanism which has, as an operation unit, an intake air control valve that opens and closes an air intake system so as to swirl the mixture gas and to homogenize the mixture gas.

11. An apparatus for diagnosing a mixture leaning mechanism in an internal combustion engine, comprising:

an assist air feeding mechanism incorporating a valve for opening and closing a supply passage for an assist air, for bringing fuel injected from a fuel injection valve into collision with a portion of intake air as the assist air to atomize the fuel;

stability detecting means for detecting stability of an engine;

air-to-fuel ratio increasing means for gradually increasing an air-to-fuel ratio of the combustion mixture gas under a condition where said valve is controlled to open and the assist air is supplied, until the stability of the engine detected by said stability detecting means reaches a previously set allowable limit; and malfunction diagnosing means for outputting a fault diagnosis signal indicating occurrence of a malfunction in said assist air feeding mechanism when, at a moment when the stability of the engine has reached the allowable limit, the air-to-fuel ratio obtained by said air-to-fuel increasing means is equal to or smaller than a reference air-to-fuel ratio expected under a condition where the assist air is normally supplied.

12. An apparatus for diagnosing a mixture leaning mechanism in an internal combustion engine, comprising:

an intake air control mechanism including an intake air control valve which opens and closes an intake system so as to swirl a mixture gas and to homogenize the mixture gas;

stability detecting means for detecting stability of an engine;

air-to-fuel ratio increasing means for gradually increasing an air-to-fuel ratio of the combustion mixture gas under a condition where the intake air control valve is controlled to close so as to swirl the mixture gas until the stability of the engine detected by said stability detecting means reaches a previously set allowable limit; and malfunction diagnosing means for outputting a fault diagnosis signal indicating occurrence of a malfunction in said intake air control mechanism when, at a moment when the stability of the engine has reached the allowable limit, the air-to-fuel ratio is equal to or smaller than a reference air-to-fuel ratio expected under a condition where the mixture gas is normally swirled by said intake air control valve.

13. An apparatus for diagnosing a mechanism for improving combustion in an internal combustion engine according to claim 12, wherein said stability detecting means includes a cylinder pressure detecting means which detects the pressure in a cylinder of the engine, and calculates a rate of change in the pressure in the cylinder of the engine detected by said cylinder pressure detecting means as a parameter for indicating the stability of the engine.

14. An apparatus for diagnosing a mechanism for improving combustion in an internal combustion engine according to claim 12, wherein said stability detecting means includes a rotational speed detecting means which detects the rotational speed of the engine, and calculates a rate of change in the rotational speed of the engine detected by said rotational speed detecting means as a parameter for indicating the stability of the engine.

15. An method for diagnosing a mixture leaning mechanism in an internal combustion engine, the mixture leaning mechanism including an assist air feeding mechanism incorporating a valve for opening and closing a supply passage for an assist air, for bringing fuel injected from a fuel injection valve into collision with a portion of intake air as the assist air to atomize the fuel, comprising the steps of:

detecting stability of an engine;

gradually increasing an air-to-fuel ratio of the combustion mixture gas under a condition where said valve of said assist air feeding mechanism is controlled to open and the assist air is supplied, continuing said step of gradually increasing until the detected stability of the engine reaches a previously set allowable limit; and outputting a fault diagnosis signal indicating occurrence of a malfunction in said assist air feeding mechanism when, at a moment when the detected stability of the engine has reached the allowable limit, the air-to-fuel ratio obtained by said air-to-fuel increasing means is equal to or smaller than a reference air-to-fuel ratio expected under a condition where the assist air is normally supplied.

16. A method for diagnosing a mixture leaning mechanism in an internal combustion engine, the mixture leaning mechanism including an intake air control mechanism having an intake air control valve which opens and closes an intake system so as to swirl a mixture gas and to homogenize the mixture gas, comprising the steps of:

detecting stability of an engine;

gradually increasing an air-to-fuel ratio of the combustion mixture gas under a condition where the intake air control valve is controlled to close so as to swirl the mixture gas, continuing said step of gradually increasing until the detected stability of the engine reaches a previously set allowable limit; and outputting a fault diagnosis signal indicating occurrence of a malfunction in said intake air control mechanism when, at a moment when the detected stability of the engine has reached the allowable limit, the air-to-fuel ratio is equal to or smaller than a reference air-to-fuel ratio expected under a condition where the mixture gas is normally swirled by said intake air control valve.

17. A method in accordance with claim 16 wherein said step of detecting stability comprises the steps of:

detecting cylinder pressure in a cylinder of the engine, and calculating a rate of change in the cylinder pressure in the cylinder of the engine as a parameter for indicating the stability of the engine.

18. A method in accordance with claim 16 wherein said step of detecting stability comprises the steps of:

detecting the rotational speed of the engine, and calculating a rate of change in the rotational speed of the engine as a parameter for indicating the stability of the engine.

* * * * *